(12) United States Patent
Ives et al.

(10) Patent No.: US 8,784,005 B2
(45) Date of Patent: Jul. 22, 2014

(54) TURBINE INSTALLATION METHOD

(75) Inventors: James Ives, Dublin (IE); Paul Dunne, Dublin (IE)

(73) Assignee: OpenHydro Group Limited, Dublin (IE)

( * ) Notice: Subject to any disclaimer, the term of this patent is extended or adjusted under 35 U.S.C. 154(b) by 827 days.

(21) Appl. No.: 12/988,068

(22) PCT Filed: Apr. 16, 2009

(86) PCT No.: PCT/EP2009/002793
§ 371 (c)(1),
(2), (4) Date: Dec. 16, 2010

(87) PCT Pub. No.: WO2009/127415
PCT Pub. Date: Oct. 22, 2009

(65) Prior Publication Data
US 2011/0088253 A1    Apr. 21, 2011

(30) Foreign Application Priority Data
Apr. 17, 2008    (EP) .................................... 08007477

(51) Int. Cl.
*E02B 9/08*    (2006.01)
(52) U.S. Cl.
USPC ............................................. 405/76; 405/169
(58) Field of Classification Search
USPC ........... 405/75, 76, 169, 170, 173; 290/42, 53
See application file for complete search history.

(56) References Cited

U.S. PATENT DOCUMENTS

| | | | |
|---|---|---|---|
| 228,467 A | 6/1880 | Maclay |
| 928,536 A | 7/1909 | Pino |
| 1,710,103 A | 4/1929 | Nelson |
| 2,054,142 A | 9/1936 | Sharp |
| 2,470,797 A | 5/1949 | Thomas |
| 2,501,696 A | 3/1950 | Souczek |
| 2,563,279 A | 8/1951 | Rushing |
| 2,658,453 A | 11/1953 | Walters |
| 2,782,321 A | 2/1957 | Fischer |
| 2,792,505 A | 5/1957 | Baudry |
| 2,874,547 A | 2/1959 | Fiore |

(Continued)

FOREIGN PATENT DOCUMENTS

| | | |
|---|---|---|
| CA | 2388513 | 8/2000 |
| CA | 2352673 | 1/2003 |

(Continued)

OTHER PUBLICATIONS

International Search Report completed May 26, 2009, mailed Jun. 4, 2009, from corresponding International Application No. PCT/EP2009/002793.

(Continued)

*Primary Examiner* — Frederick L Lagman
(74) *Attorney, Agent, or Firm* — Gardner, Linn, Burkhart & Flory LLP

(57) ABSTRACT

The present invention provides a method of installing a hydroelectric turbine onto the seabed or the like while ensuring that a pre-laid electrical cable connected to the turbine prior to lowering to the seabed is not damaged during installation of the turbine, the method involving lowering the turbine towards the seabed while simultaneously displacing the turbine in order to maintain tension in the electrical cable.

14 Claims, 1 Drawing Sheet

(56) References Cited

U.S. PATENT DOCUMENTS

| | | |
|---|---|---|
| 3,078,680 A | 2/1963 | Wapsala |
| 3,209,156 A | 9/1965 | Struble, Jr. |
| 3,292,023 A | 12/1966 | Korber |
| 3,342,444 A | 9/1967 | Nelson |
| 3,355,998 A | 12/1967 | Roemisch |
| 3,384,787 A | 5/1968 | Schwartz |
| 3,422,275 A | 1/1969 | Braikevitch et al. |
| 3,433,024 A | 3/1969 | Diamond et al. |
| 3,477,236 A | 11/1969 | Burrus |
| 3,487,805 A | 1/1970 | Satterthwaite et al. |
| 3,708,251 A | 1/1973 | Pierro |
| 3,986,787 A | 10/1976 | Mouton, Jr. et al. |
| 3,987,638 A | 10/1976 | Burkhardt et al. |
| 4,095,918 A | 6/1978 | Mouton et al. |
| 4,163,904 A | 8/1979 | Skendrovic |
| 4,219,303 A | 8/1980 | Mouton, Jr. et al. |
| 4,274,009 A | 6/1981 | Parker, Sr. |
| 4,367,413 A | 1/1983 | Nair |
| 4,421,990 A | 12/1983 | Heuss et al. |
| 4,427,897 A | 1/1984 | Migliori |
| 4,523,878 A | 6/1985 | Richart et al. |
| 4,541,367 A | 9/1985 | Lindberg |
| 4,613,762 A | 9/1986 | Soderholm |
| 4,720,640 A | 1/1988 | Anderson et al. |
| 4,740,711 A | 4/1988 | Sato et al. |
| 4,744,697 A | 5/1988 | Coppens |
| 4,744,698 A | 5/1988 | Dallimer et al. |
| 4,810,135 A | 3/1989 | Davenport et al. |
| 4,867,605 A | 9/1989 | Myers et al. |
| 4,868,408 A | 9/1989 | Hesh |
| 4,868,970 A | 9/1989 | Schultz et al. |
| 4,990,810 A | 2/1991 | Newhouse |
| 5,592,816 A | 1/1997 | Williams |
| 5,606,791 A | 3/1997 | Fougere et al. |
| 5,609,441 A | 3/1997 | Khachaturian |
| 5,656,880 A | 8/1997 | Clark |
| 5,662,434 A | 9/1997 | Khachaturian |
| 5,715,590 A | 2/1998 | Fougere et al. |
| 5,800,093 A | 9/1998 | Khachaturian |
| 5,998,905 A | 12/1999 | Fougere et al. |
| 6,039,506 A | 3/2000 | Khachaturian |
| 6,109,863 A | 8/2000 | Milliken |
| 6,113,314 A | 9/2000 | Campbell |
| 6,166,472 A | 12/2000 | Pinkerton |
| 6,168,373 B1 | 1/2001 | Vauthier |
| 6,232,681 B1 | 5/2001 | Johnston et al. |
| 6,242,840 B1 | 6/2001 | Denk et al. |
| 6,293,734 B1 | 9/2001 | Thomas et al. |
| 6,300,689 B1 | 10/2001 | Smalser |
| 6,367,399 B1 | 4/2002 | Khachaturian |
| 6,406,251 B1 | 6/2002 | Vauthier |
| 6,409,466 B1 | 6/2002 | Lamont |
| 6,445,099 B1 | 9/2002 | Roseman |
| 6,476,709 B1 | 11/2002 | Wuidart et al. |
| 6,612,781 B1 | 9/2003 | Jackson |
| 6,648,589 B2 | 11/2003 | Williams |
| RE38,336 E | 12/2003 | Williams |
| 6,729,840 B2 | 5/2004 | Williams |
| 6,770,987 B1 | 8/2004 | Sogard et al. |
| 6,777,851 B2 | 8/2004 | Maslov |
| 6,806,586 B2 | 10/2004 | Wobben |
| 6,840,713 B1 | 1/2005 | Schia et al. |
| 6,843,191 B1 | 1/2005 | Makotinsky |
| 6,857,821 B2 | 2/2005 | Steenhuis et al. |
| 6,957,947 B2 | 10/2005 | Williams |
| 6,995,479 B2 * | 2/2006 | Tharp ............ 290/54 |
| 6,998,730 B2 * | 2/2006 | Tharp ............ 290/54 |
| 7,190,087 B2 | 3/2007 | Williams |
| D543,495 S | 5/2007 | Williams |
| 7,275,891 B2 | 10/2007 | Owen et al. |
| 7,352,078 B2 | 4/2008 | Gehring |
| 7,378,750 B2 | 5/2008 | Williams |
| 7,425,772 B2 | 9/2008 | Novo Vidal |
| 7,471,009 B2 | 12/2008 | Davis et al. |
| 7,527,006 B2 | 5/2009 | Khachaturian |
| 7,611,307 B2 | 11/2009 | Owen et al. |
| 7,845,296 B1 | 12/2010 | Khachaturian |
| 7,874,788 B2 | 1/2011 | Stothers et al. |
| 7,976,245 B2 * | 7/2011 | Finnigan ............ 405/75 |
| 2002/0034437 A1 | 3/2002 | Williams |
| 2003/0044272 A1 | 3/2003 | Addie et al. |
| 2003/0137149 A1 | 7/2003 | Northrup et al. |
| 2003/0168864 A1 | 9/2003 | Heronemus et al. |
| 2003/0193198 A1 | 10/2003 | Wobben |
| 2003/0218338 A1 | 11/2003 | O'Sullivan et al. |
| 2004/0021437 A1 | 2/2004 | Maslov et al. |
| 2004/0201299 A1 | 10/2004 | Naritomi et al. |
| 2004/0227500 A1 | 11/2004 | O'Meara |
| 2004/0262926 A1 | 12/2004 | Hansen |
| 2005/0005592 A1 | 1/2005 | Fielder |
| 2005/0031442 A1 | 2/2005 | Williams |
| 2006/0261597 A1 | 11/2006 | Gehring |
| 2007/0018459 A1 | 1/2007 | Williams |
| 2007/0063448 A1 | 3/2007 | Kowalczyk |
| 2007/0231072 A1 | 10/2007 | Jennings et al. |
| 2007/0291426 A1 | 12/2007 | Kasunich et al. |
| 2008/0012538 A1 | 1/2008 | Stewart et al. |
| 2008/0236159 A1 * | 10/2008 | Tierney ............ 290/53 |
| 2009/0162144 A1 * | 6/2009 | Ayre ............ 405/76 |
| 2009/0243298 A1 * | 10/2009 | Jean et al. ............ 290/53 |
| 2009/0278357 A1 | 11/2009 | Williams |
| 2010/0025998 A1 | 2/2010 | Williams |
| 2010/0026002 A1 | 2/2010 | Spooner |
| 2010/0068037 A1 | 3/2010 | Ives |
| 2010/0172698 A1 | 7/2010 | Ives et al. |
| 2010/0196100 A1 * | 8/2010 | Soe-Jensen ............ 405/169 |
| 2010/0201129 A1 | 8/2010 | Holstein et al. |
| 2010/0232885 A1 | 9/2010 | Ives et al. |
| 2010/0295388 A1 | 11/2010 | Ives et al. |
| 2011/0018274 A1 | 1/2011 | Ives et al. |
| 2011/0110770 A1 | 5/2011 | Spooner et al. |
| 2011/0305518 A1 * | 12/2011 | Pearce et al. ............ 405/75 |
| 2012/0027522 A1 * | 2/2012 | Ives et al. ............ 405/184.4 |
| 2012/0187680 A1 | 7/2012 | Spooner et al. |
| 2012/0235412 A1 | 9/2012 | Dunne et al. |

FOREIGN PATENT DOCUMENTS

| | | |
|---|---|---|
| CH | 260699 | 4/1947 |
| CH | 146935 | 8/1983 |
| DE | 31 16 740 A1 | 11/1982 |
| DE | 3116740 | 11/1982 |
| DE | 3638129 | 5/1988 |
| DE | 3718954 | 12/1988 |
| DE | 19948198 | 4/2001 |
| DE | 10101405 | 7/2002 |
| DE | 20308901 | 9/2003 |
| DE | 10244038 | 4/2004 |
| DE | 102007016380 | 10/2008 |
| EP | 1318299 | 12/2003 |
| EP | 1564455 | 1/2005 |
| EP | 1691377 | 2/2006 |
| EP | 1876350 | 1/2008 |
| EP | 1878912 | 1/2008 |
| EP | 1878913 | 1/2008 |
| EP | 1879280 | 1/2008 |
| EP | 1878911 | 9/2008 |
| EP | 1992741 | 11/2008 |
| EP | 1885047 | 12/2008 |
| EP | 1980670 | 7/2009 |
| EP | 2088311 | 8/2009 |
| EP | 2110910 | 10/2009 |
| EP | 2112370 | 10/2009 |
| EP | 1980746 | 6/2010 |
| EP | 2199199 | 6/2010 |
| EP | 2199598 | 6/2010 |
| EP | 2199599 | 6/2010 |
| EP | 2199601 | 6/2010 |
| EP | 2199602 | 6/2010 |
| EP | 2199603 | 6/2010 |
| EP | 2200170 | 6/2010 |
| EP | 2071709 | 9/2010 |
| EP | 2209175 | 9/2010 |
| EP | 2241749 | 10/2010 |

(56) References Cited

FOREIGN PATENT DOCUMENTS

| | | |
|---|---|---|
| EP | 2302204 | 3/2011 |
| EP | 2302755 | 3/2011 |
| EP | 2302766 | 3/2011 |
| FR | 2823177 | 10/2002 |
| FR | 2 859 495 A | 3/2005 |
| GB | 204505 | 10/1923 |
| GB | 924347 | 4/1963 |
| GB | 980575 | 1/1965 |
| GB | 1131352 | 10/1968 |
| GB | 1413835 | 11/1975 |
| GB | 2 316 461 A | 2/1998 |
| GB | 2344843 | 6/2000 |
| GB | 2408294 | 5/2005 |
| GB | 2431628 | 5/2007 |
| GB | 2434413 | 7/2007 |
| GB | 2447514 | 9/2008 |
| JP | 59203881 | 11/1984 |
| JP | 63055370 | 3/1988 |
| JP | 01043908 | 2/1989 |
| JP | 2000341818 | 12/2000 |
| JP | 2005069025 | 3/2005 |
| JP | 2005248822 | 9/2005 |
| JP | 2006094645 | 4/2006 |
| JP | 2007255614 | 10/2007 |
| JP | 2007291882 | 11/2007 |
| WO | WO 98/44372 A | 10/1998 |
| WO | 9852819 | 11/1998 |
| WO | 9966623 | 12/1999 |
| WO | 0077393 | 12/2000 |
| WO | 0134973 | 5/2001 |
| WO | 0134977 | 5/2001 |
| WO | 02099950 | 12/2002 |
| WO | 03014561 | 2/2003 |
| WO | 03025385 | 3/2003 |
| WO | 03046375 | 6/2003 |
| WO | 2004015264 | 2/2004 |
| WO | 2004027257 | 4/2004 |
| WO | 2004107549 | 12/2004 |
| WO | 2004113717 | 12/2004 |
| WO | 2005045243 | 5/2005 |
| WO | 2005061887 | 7/2005 |
| WO | 2005078233 | 8/2005 |
| WO | 2005080789 | 9/2005 |
| WO | 2005116443 | 12/2005 |
| WO | 2006029496 | 3/2006 |
| WO | 2007043894 | 4/2007 |
| WO | 2007055585 | 5/2007 |
| WO | 2007083105 | 7/2007 |
| WO | 2007086814 | 8/2007 |
| WO | 2007125349 | 11/2007 |
| WO | 2008004877 | 1/2008 |
| WO | 2008006614 | 1/2008 |
| WO | 2008050149 | 5/2008 |
| WO | 2008081187 | 7/2008 |
| WO | WO2010118766 | 10/2010 |
| WO | WO2011039249 | 4/2011 |
| WO | WO2011039255 | 4/2011 |
| WO | WO2011039267 | 4/2011 |

OTHER PUBLICATIONS

PCT Written Opinion of International Searching Authority, Jun. 4, 2009.
Notification of Transmittal, mailed Jun. 4, 2009.
U.S. Appl. No. 13/133,235, filed Jun. 7, 2011, including the specification, claims and drawings.
U.S. Appl. No. 13/133,805, filed Jun. 9, 2011, including the specification, claims and drawings.
U.S. Appl. No. 13/133,504, filed Jun. 8, 2011, including the specification, claims and drawings.
U.S. Appl. No. 13/133,507, filed Jun. 8, 2011, including the specification, claims and drawings.
U.S. Appl. No. 13/133,832, filed Jun. 9, 2011, including the specification, claims and drawings.
U.S. Appl. No. 13/264,667, filed Oct. 14, 2011, including specification, claims and drawings.

* cited by examiner

TURBINE INSTALLATION METHOD

FIELD OF THE INVENTION

The present invention is concerned with an improved method of installing a hydroelectric turbine onto the seabed or the like; and in particular a method which improves the handling of the electrical cable connected between the hydroelectric turbine and an onshore power station to which electricity generated by the turbine is supplied.

BACKGROUND OF THE INVENTION

Due to the environmental damage which has been inflicted on the planet as a result of the burning of fossil fuels, renewable energy has finally begun to be given significant attention, with many projects being developed around solar energy, wind energy, and tidal power. Of these alternative forms of energy, tidal power is arguably the most attractive, given that tidal flows are entirely predictable and constant, unlike wind or solar energy which are relatively intermittent and therefore less dependable.

However, harnessing tidal energy does provide its own challenges, in particular with respect to the installation and maintenance of tidal power generators, for example hydroelectric turbines, which by the very nature of the operation of same must be located in relatively fast flowing tidal currents, and more than likely located on the seabed. In addition, in order to be economically viable these turbines must be built on a large scale. Essentially however these turbines must deliver power back to shore for eventual supply into the grid. The level of electricity generated by the turbines renders working on the electrical systems a hazardous operation, and this is magnified by the location of the turbines under water on the seabed, and in regions of fast flowing tides. These regions of fast flowing tides are often found in isolated locations making getting to and from the site a time consuming, dangerous, and therefore expensive undertaking. In addition, the process of installing and removing such turbines generally requires the use of multiple vessels and associated heavy machinery, in addition to experience divers. Furthermore, these turbines will generally need to be deployed in multiples in the form of a tidal turbine farm in order to be economically viable. Thus the installation process is multiplied by the number of turbines to be installed. The availability of such equipment and divers is relative scare, and thus it is extremely desirable to reduce the time and equipment necessary to perform the installation and removal of tidal turbines.

Due to both the relatively large electric currents generated by hydroelectric turbines, and the extremely harsh conditions under which the turbines and associated electrical cables are exposed, the electrical cable extending onshore from each turbine must be relatively large and robust. As a result of the diameter of the cable, which may be in the region of 300-500 mm, and given the length of cable involved, the weight of the cable is significant. The handling of the cable is therefore both a difficult and time-consuming operation, made even more difficult by the tidal conditions present at the sites where hydroelectric turbines are deployed. The cabling is also relatively inflexible and so the mishandling of same can quickly and easily result in kinking/knotting of the cable, thus rendering same permanently damaged and therefore requiring replacement.

It is therefore an object of the present invention to provide a method of installing a hydroelectric turbine, which method avoids damage to the cable during the installation process.

SUMMARY OF THE INVENTION

The present invention therefore provides a method of installing a hydroelectric turbine system at a tidal site comprising the steps of:
connecting a pre-laid power cable to the system;
lowering the system towards a deployment site while simultaneously displacing the system in line with the direction of tidal flow such as to maintain tension in the cable.

Preferably, the method comprises positioning the system substantially above the deployment site prior to connecting the cable.

Preferably, the method comprises lowering the system from a deployment vessel and simultaneously displacing the deployment vessel such as to maintain tension in the cable.

Preferably, the deployment vessel comprises a source of propulsion.

Preferably, the method comprises the step of positioning an anchor to be upstream of the system during the lowering step; directly or indirectly connecting the system to the anchor; and using the anchor to achieve the displacement of the system during the lowering thereof.

Preferably, the method comprises positioning the anchor on the seabed.

Preferably, the method comprises the steps of towing the deployment vessel behind a towing vessel; and utilising the towing vessel to achieve the displacement of the deployment vessel.

Preferably, the method comprises the step of winching the deployment vessel towards the towing vessel during lowering of the system in order to achieve the displacement of the deployment vessel.

Preferably, the method comprises the step of securing the towing vessel to the anchor and pulling the towing vessel towards the anchor to at least partially achieve the displacement of the deployment vessel.

Preferably, the deployment vessel or the towing vessel comprises a dynamic positioning vessel.

Preferably, the method comprises the step of marking the location of the pre-laid cable with a floatation device.

Preferably, the method comprises lowering the system during a running tide.

Preferably, the method comprises the step of laterally displacing the system prior to or as part of final positioning of the system at the deployment site.

As used herein, the term "hydroelectric turbine system" is intended to mean either a hydroelectric turbine mounted on a base, which can be lowered together onto the seabed; the base in isolation from the turbine, which may be lowered to the seabed and the turbine subsequently lowered into position onto the base; or the turbine in isolation from the base, to be lowered onto the previously located base.

DETAILED DESCRIPTION OF THE DRAWINGS

Referring now to the accompanying drawings, there is illustrated a method of installing a hydroelectric turbine 10 onto the seabed B at a tidal site according to a preferred embodiment of the invention. While the following description refers to installing the turbine 10 on the seabed B it will be appreciated that the method of the invention may be employed at any other suitable or desired location, for example installing the turbine 10 onto a river bed or the like.

Figure 1:
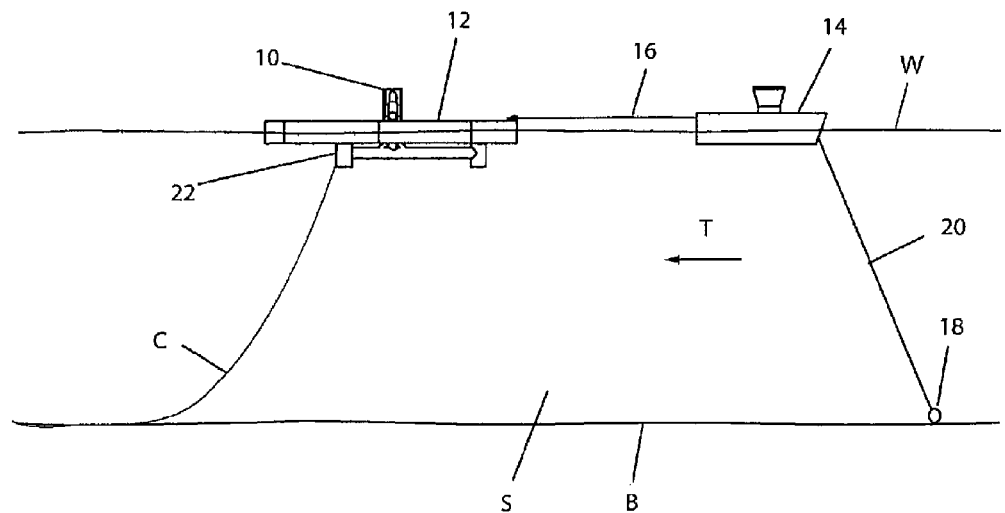
FIG. 1 illustrates a schematic side elevation of a hydroelectric turbine system in the early stages of installation and according to the method of the present invention.

Referring now in particular to FIG. 1, the method of the present invention involves transporting the turbine 10 into a position substantially above a tidal deployment site S on the seabed B where the turbine 10 is to be located during use. Prior to transporting the turbine 10 into position above the tidal deployment site S an electrical cable C is pre-laid on the seabed B. The processes involved in laying the cable C from an onshore location, or from some other location, to the deployment site S are well known and will not be described in any detail hereinafter. The final stretch of the cable C leading to the deployment site S, for example the last 100 meters, is laid substantially in line with the direction of the prevailing tide T. In order to allow the location and retrieval of the free end of the cable C it is preferable that a flotation device in the form of a buoy (not shown) or the like is tethered at or adjacent the free end of the cable C and therefore locatable on the surface of the water W once the turbine 10 is brought into position above the tidal deployment site S. It is also envisaged that it may be more practical to attach an umbilical or extension (not shown) onto the end of the cable C, and that the umbilical/extension would then be the portion that gets raised and lowered from the seabed B. The cable C may be used to take power directly ashore, or for daisy chaining the turbine 10 to one or more additional turbines (not shown).

With the cable C pre-laid to the deployment site S the turbine 10 is, as mentioned above, brought into position substantially above the deployment site S. In the preferred embodiment illustrated the turbine 10 is carried by a deployment vessel 12 which may be of any suitable form and, in the embodiment illustrated, is in the form of a non-powered barge 12. The deployment vessel 12 may however comprise a source of propulsion. A towing vessel in the form of a tug 14 is used in order to tow the turbine 10 and barge 12 into position, and in the embodiment illustrated, against the running tide T. In this embodiment a simple tow line 16 is connected between the tug 14 and the barge 12, and may be adjusted in length in order to make small corrections to the position of the turbine 10 and barge 12. The tug 14 could however be replaced with a dynamic positioning vessel (not shown) which could then utilise GPS in order to accurately maintain a desired position during the installation process. The turbine 10 may be releasably connected to the barge 12 by any number of suitable arrangements, and the details of the connection are not material to the method of the invention, and so will not be described in detail hereinafter.

Prior to towing the turbine 10 into position above the deployment S at least one anchor 18 is installed, in the embodiment illustrated, at a location on the seabed B upstream of the tidal deployment site S with respect to the direction in which the tide T is flowing during the installation. The anchor 18 may be of any suitable form, and in the embodiment illustrated is in the form of a simple rock-type anchor 18. However, the type and/or size of anchor 18 may vary depending on the conditions on the seabed B. Again in order to mark the position above the water W of the anchor 18 it is preferable that a tethered buoy (not shown) or similar marker is secured to the anchor 18, and for reasons described hereinafter.

Once the tug 14 has positioned the turbine 10 and barge 12 above the deployment site S the tug 14 is connected to the anchor 18 via an anchor line 20. This is achieved simply by retrieving the buoy (not shown) connected to the anchor 18 onto the tug 14 and then suitably securing the anchor line 20 to the tug 14. The anchor 18 now allows the tug 14, and therefore the turbine 10 and barge 12, to hold position against the running tide T. It should however be noted at this point, and as will become clear from the following description of the method of installation of the present invention, that the tug 14 may be dispensed with, and in such a scenario the vessel 12 would be connected directly to the anchor 18. This is a possibility regardless of whether the vessel 12 has a source of propulsion or not.

Once the turbine 10 and vessel 12 are secured against the running tide T by the anchor 18, the free end of the cable C (or umbilical) is recovered to the surface and electrically connected to the turbine 10 in known manner. The cable C may be recovered using a conventional winch arrangement provided on the barge 12, or may be achieved by a separate support vessel (not shown). At this point the turbine 10 is prepared for lowering to the seabed B. In the embodiment illustrated the turbine 10 is pre-mounted on a base 22 which will support the turbine 10 on the seabed B during use. Thus in the embodiment illustrated it is the base 22 which is used to secure the turbine 10 to the barge 12. The turbine 10 and base 22 together define a hydroelectric turbine system. It is envisaged that the cable C could be connected to the base 22, with a suitable connection then being provided between the base 22 and the turbine 10.

Figure 2:
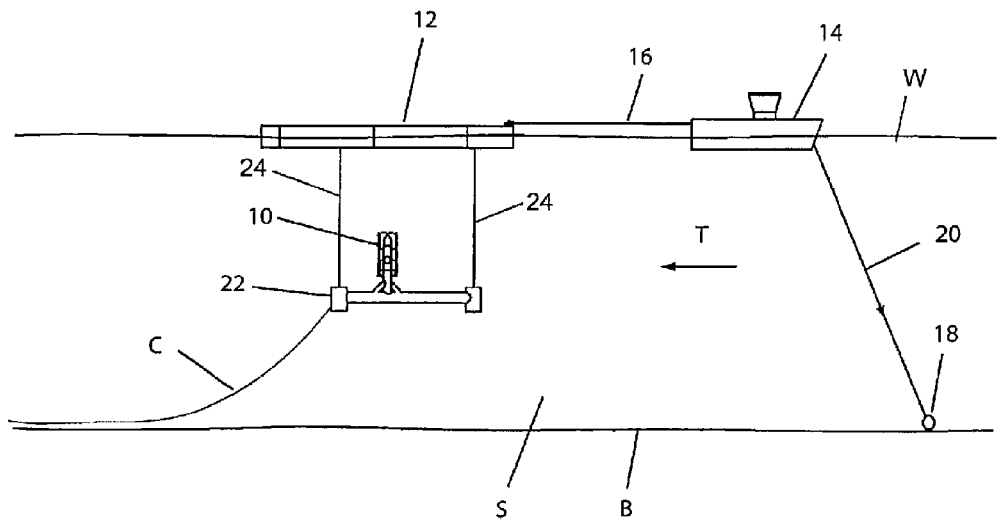
FIG. 2 illustrates a schematic illustration of the method of deployment shown in FIG. 1, with the hydroelectric turbine system partially lowered toward the seabed.

Referring then to FIG. 2 the turbine 10 and base 22 are now lowered towards the seabed B. This may be achieved by any suitable means, and in the embodiment illustrated a number of support lines 24 are connected between the barge 12 and the base 22. The barge 12 is therefore provided with a corresponding number of winches (not shown) which are operable to raise and lower the support lines 24, and therefore raise and lower the base 22 and turbine 10 towards or away from the seabed B. In the embodiment illustrated the turbine 10 and base 22 are connected in an under slung arrangement to the barge 12 in order to allow the turbine 10 and base 22 to be quickly and easily lowered away from the barge 12 towards the seabed B. Any other suitable arrangement may however be employed.

While the turbine 10 is being lowered towards the seabed B it is simultaneously displaced in line with the direction of tidal flow, and in the embodiment illustrated forwardly against the running tide T and towards the anchor 18, such as to maintain tension in the cable C. This is achieved by either pulling the tug 14 forwardly on the anchor 18, or by shortening the tow line 16 between the tug 14 and the barge 12, or a combination of the above-mentioned procedures. However as mentioned above, the tug 14 may be omitted and the barge 12 connected directly to the anchor 18. In this case the line (not shown) connecting the barge 12 to the anchor 18 would be used to pull the barge 12 forward against the tide T. In either scenario, the turbine 10 will be lowered towards the seabed B along an arced path with the cable C remaining in line with the direction of tidal flow. This path ensures that tension is maintained in the electrical cable C connected to the turbine 10 or base 22. This tension ensures that no kinking or knotting of the cable C can occur during the lowering of the turbine 10. Once the turbine 10 is positioned on the seabed B each of the support lines 24 can be disconnected therefrom and winched back up onto the barge 12. At this point the turbine 10 may begin operation and feeding power onshore via the cable C, or to any other desired location. At this point, the cable C should be in a straight line with respect to the direction of tidal flow T, and under tension in order to prevent any undue movement thereof during operation.

It will be appreciated that the above described method of installation could be achieved in the absence of the anchor 18, although with greater difficulty. The tug 14, or preferably dynamic positioning vessel (not shown) could be used to initially hold the position of the turbine 10 and barge 12 against the tide T while the cable C is connected to the turbine 10. Once lowering of the turbine 10 is commenced the tug 14 could then pull the barge 12 forwardly in order to achieve the above mention arced path of the turbine 10.

If it is desired to relocate the turbine 10 for whatever reason, this can be achieved before the support lines 24 are disconnected from the base 22. Relocation may be required for example due to an undesirable attitude of the base 22 following initial installation on the seabed B. Due to the configuration of the cable C, where for example the last 100 meters or the like is in a straight line, the base 22 can be raised slightly off the seabed B and the tug 14 used to reposition the barge 12 laterally of the original position.

In order to remove the turbine 10 from the seabed B, for example for maintenance or replacement, the above procedure is simply reversed.

It is also envisaged that the method of the present invention could be implemented with the tide flowing in the opposite direction to that described and shown with respect to FIGS. 1 and 2. In this situation, the towing vessel 14, and anchor 18 if employed, would need to be on the other side of the barge 12 to that shown in FIGS. 1 and 2, in order to be able to hold the barge 12 in a substantially fixed position over the deployment site S. When lowering the turbine 10 towards the seabed B the tide could be used to effect displacement of the turbine such as to maintain tension in the cable C. This could be achieved for example by feeding out and therefore lengthening the towing line 16 and/or anchor line 20, and simply allowing the tide to carry the barge 12, and therefore the turbine 10, with the tide in order to maintain tension in the cable C. Again this arrangement could be effected without the use of the anchor 18.

The invention claimed is:

1. A method of installing a hydroelectric turbine system at a tidal site comprising the steps of:
   connecting a pre-laid power cable to the system;
   lowering the system towards a deployment site during a running tide while simultaneously displacing the system in line with the direction of tidal flow such that the cable is laid substantially in line with the direction of the prevailing tide and as to maintain tension in the cable.

2. The method of claim 1 comprising positioning the system substantially above the deployment site prior to connecting the cable.

3. The method of claim 1 comprising lowering the system from a deployment vessel and simultaneously displacing the deployment vessel such as to maintain tension in the cable.

4. The method of claim 3 in which the deployment vessel comprises a source of propulsion.

5. The method of claim 3 comprising the steps of towing the deployment vessel behind a towing vessel; and utilising the towing vessel to achieve the displacement of the deployment vessel.

6. The method of claim 5 comprising the step of winching the deployment vessel towards the towing vessel during lowering of the system in order to achieve the displacement of the deployment vessel.

7. The method of claim 5 comprising the steps of positioning an anchor to be upstream of the system during the lowering step; securing the towing vessel to the anchor; and pulling the towing vessel towards the anchor to at least partially achieve the displacement of the deployment vessel.

8. The method of claim 5 in which the deployment vessel or the towing vessel comprises a dynamic positioning vessel.

9. The method of claim 1 comprising the step of positioning an anchor to be upstream of the system during the lowering step; directly or indirectly connecting the system to the anchor; and using the anchor to achieve the displacement of the system during the lowering thereof.

10. The method of claim 9 comprising positioning the anchor on the seabed.

11. The method of claim 1 comprising the step of marking the location of the pre-laid cable with a floatation device.

12. The method of claim 1 comprising laterally displacing the system prior to or as part of final positioning of the system at the deployment site.

13. A method of installing a hydroelectric turbine system at a tidal site comprising the steps of:
   connecting a pre-laid power cable to the system;
   lowering the system towards a deployment site while simultaneously displacing the system in line with the direction of tidal flow such as to maintain tension in the cable; and
   positioning an anchor to be upstream of the system during the lowering step; directly or indirectly connecting the system to the anchor; and using the anchor to achieve the displacement of the system during the lowering thereof.

14. A method of installing a hydroelectric turbine system at a tidal site comprising the steps of:
   connecting a pre-laid power cable to the system;
   lowering the system towards a deployment site while simultaneously displacing the system in line with the direction of tidal flow such as to maintain tension in the cable;
   lowering the system from a deployment vessel and simultaneously displacing the deployment vessel such as to maintain tension in the cable;
   towing the deployment vessel behind a towing vessel; and utilising the towing vessel to achieve the displacement of the deployment vessel; and
   winching the deployment vessel towards the towing vessel during lowering of the system in order to achieve the displacement of the deployment vessel.

* * * * *